(12) United States Patent
Gretz

(10) Patent No.: US 9,048,642 B1
(45) Date of Patent: Jun. 2, 2015

(54) EXPANDABLE ELECTRICAL OUTLET RACEWAY SYSTEM WITH CORDLESS ELECTRICAL RECEPTACLES

(71) Applicant: Thomas J. Gretz, Port St. Lucie, FL (US)

(72) Inventor: Thomas J. Gretz, Port St. Lucie, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 20 days.

(21) Appl. No.: 14/165,951

(22) Filed: Jan. 28, 2014

Related U.S. Application Data

(60) Provisional application No. 61/759,173, filed on Jan. 31, 2013.

(51) Int. Cl.
*H02G 3/08* (2006.01)

(52) U.S. Cl.
CPC ..................................... *H02G 3/08* (2013.01)

(58) Field of Classification Search
USPC .................................................... 174/66, 67
See application file for complete search history.

(56) References Cited

U.S. PATENT DOCUMENTS

| 4,017,137 | A | * | 4/1977 | Parks | 439/135 |
| 4,872,849 | A | * | 10/1989 | Long | 439/209 |
| 5,595,495 | A | * | 1/1997 | Johnson et al. | 439/215 |

* cited by examiner

*Primary Examiner* — Dhirubhai R Patel

(57) ABSTRACT

An electrical outlet raceway that eliminates the necessity of daisy chaining or doubling of electrical cords within the raceway. The electrical outlet raceway includes a modular system of several components that can be assembled together in order to provide additional electrical outlets on a wall, including a raceway back plate, a cordless receptacle, a raceway cover, a coupler, and one or more faceplates for attaching a high or low voltage component to the raceway. The electrical outlet raceway may also include a corner, end caps, and means for attaching faceplates to the raceway. Cordless receptacles enable the use of off-the-shelf electrical cords, thus allowing the installer to plan a given installation and obtain the proper number and lengths of electrical cords required to construct the planned installation. This eliminates the inefficiencies caused by the corded receptacles of conventional electrical raceways.

10 Claims, 12 Drawing Sheets

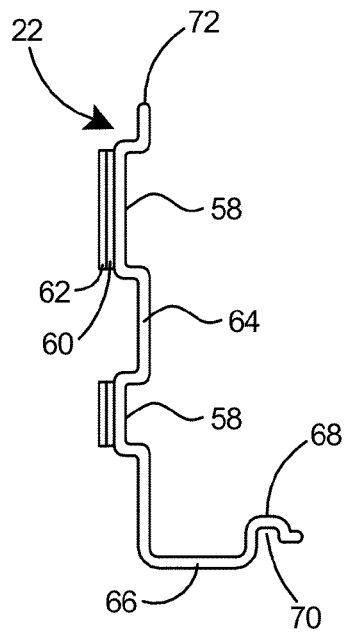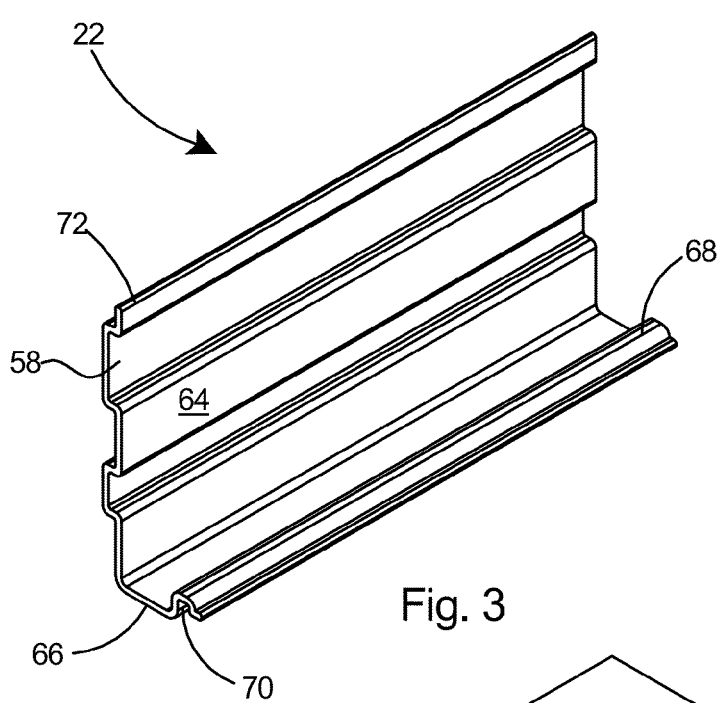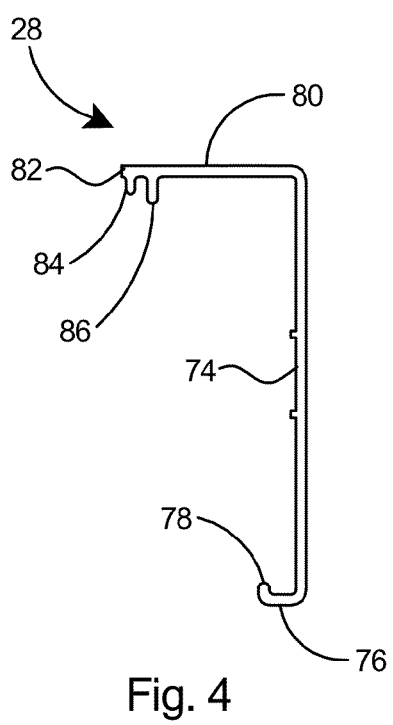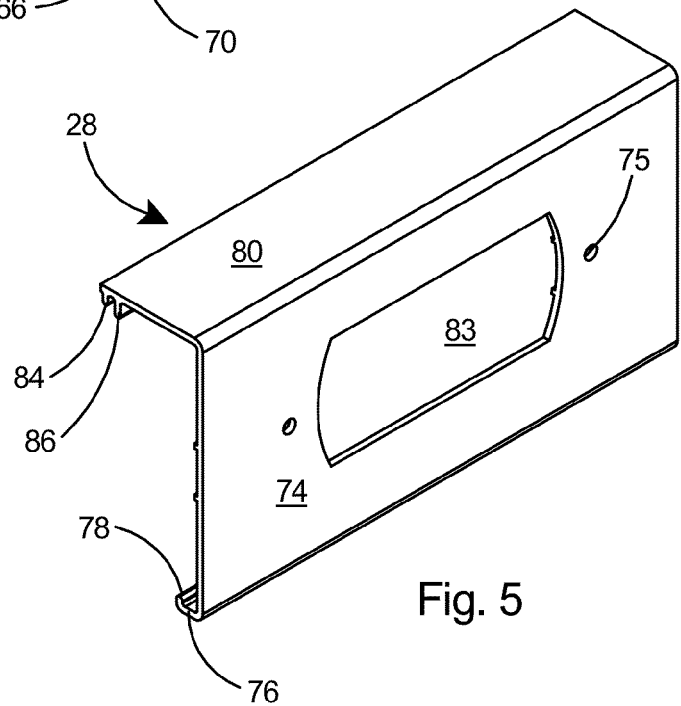
Fig. 2
Fig. 3
Fig. 4
Fig. 5

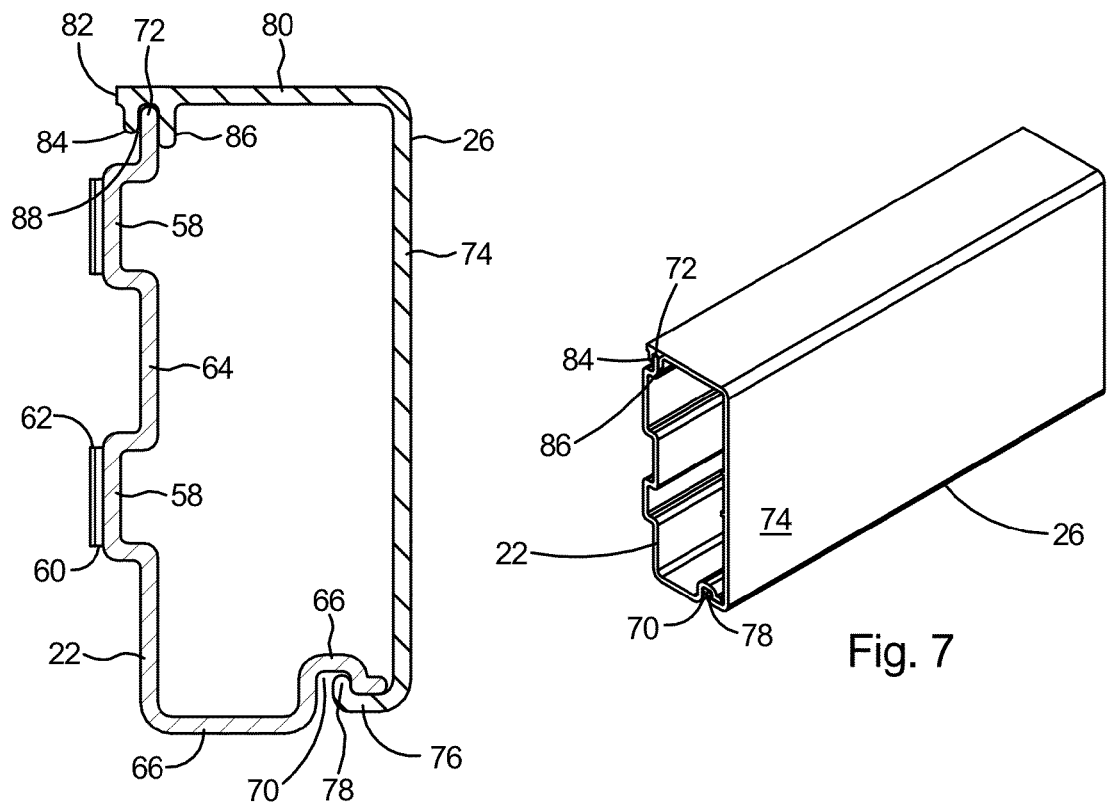
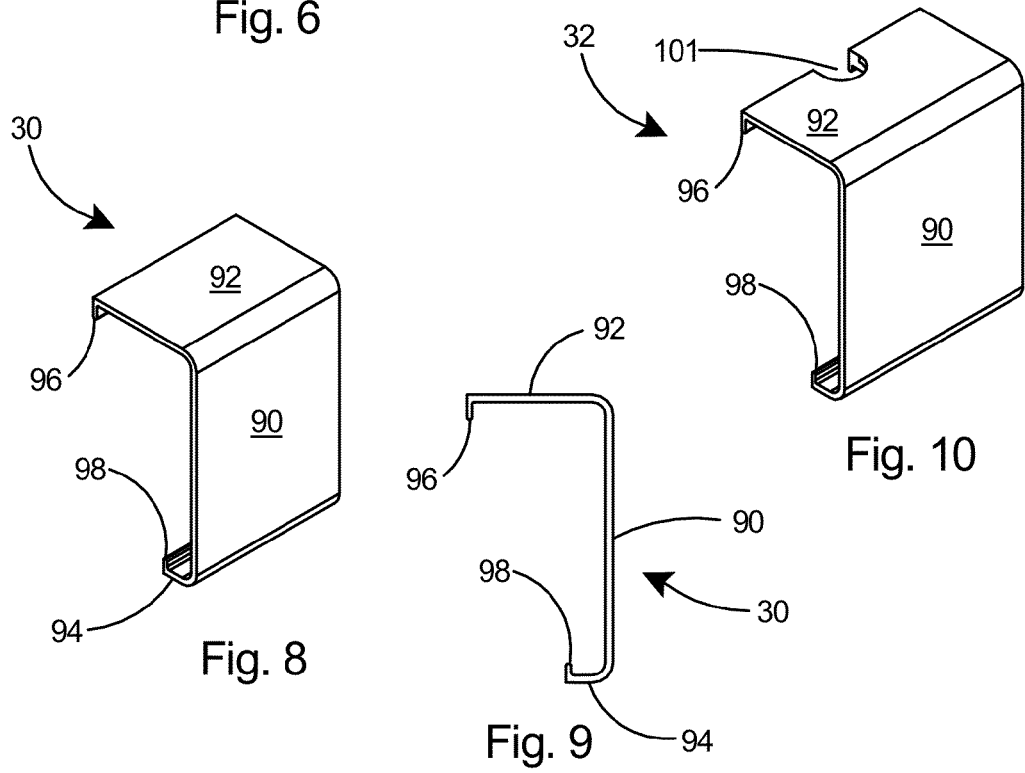
Fig. 6
Fig. 7
Fig. 8
Fig. 9
Fig. 10

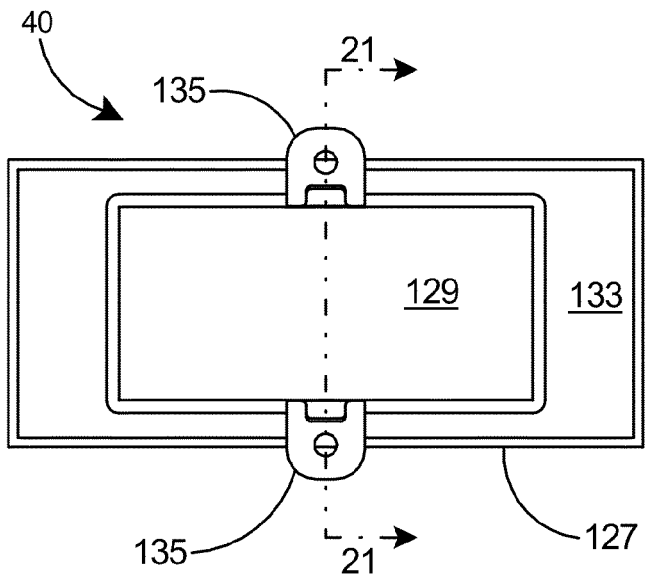
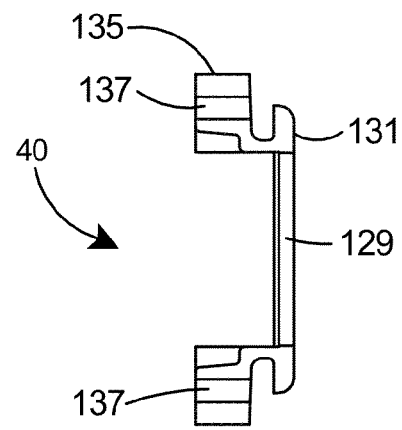
Fig. 20
Fig. 21
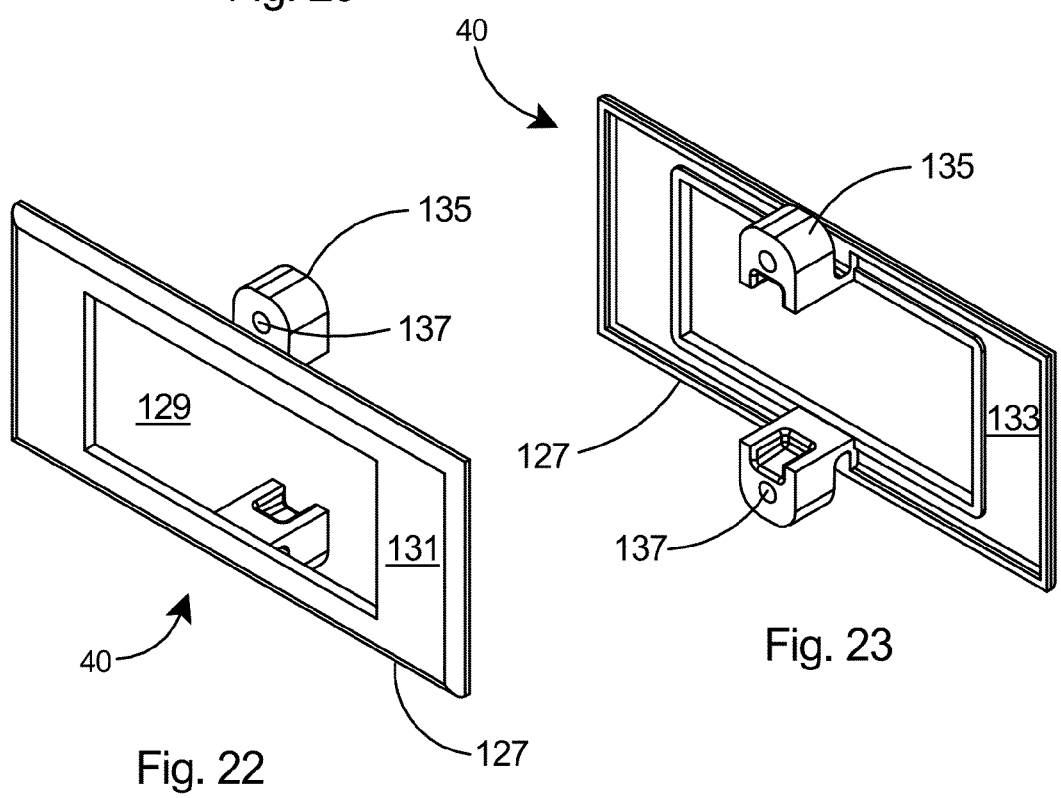
Fig. 22
Fig. 23

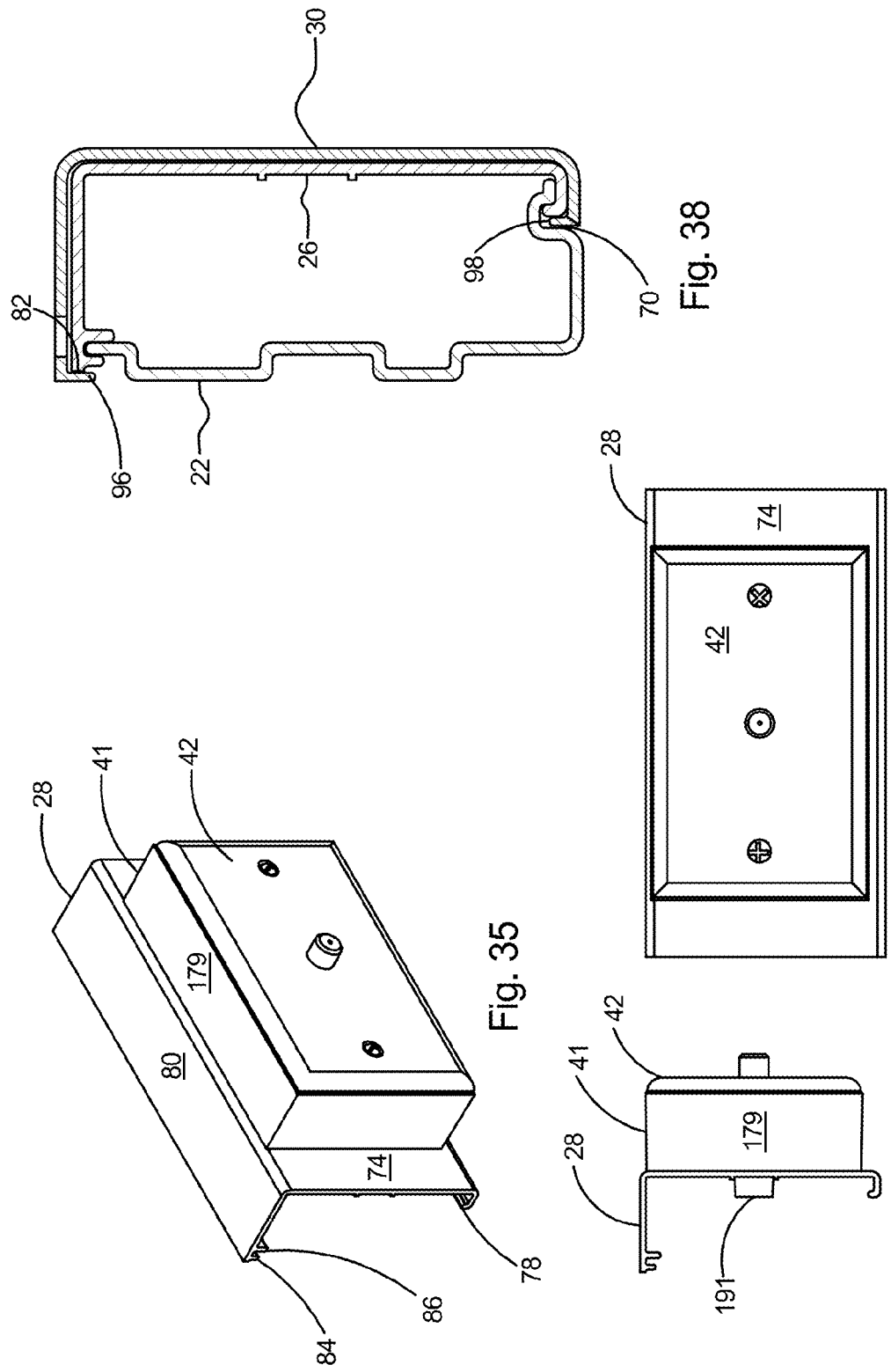

EXPANDABLE ELECTRICAL OUTLET RACEWAY SYSTEM WITH CORDLESS ELECTRICAL RECEPTACLES

CROSS-REFERENCE TO RELATED APPLICATIONS

This application claims priority to provisional U.S. Application No. 61/759,173, filed Jan. 31, 2013, the contents of which are incorporated herein by reference in their entirety.

FIELD OF THE INVENTION

The present invention generally relates to an apparatus for supplying electrical service to homes and offices, and specifically to an electrical outlet raceway system with cordless electrical receptacles.

BACKGROUND OF THE INVENTION

With the continuing increase in the number of electrical devices, such as appliances, computers, and other peripherals in residences and offices, there is a continuing need to provide additional electrical outlets for powering these devices.

The traditional method of increasing the number of outlets is by installing additional electrical wiring behind the wall surface and wiring in additional electrical boxes. The problem with this approach is that it typically involves tearing up a substantial amount of wall surface that subsequently must be repaired, including reinstalling wallboard and repainting, replacing wallpaper or equivalent wall coverings, and similar repairs.

Although prior art electrical outlet raceway systems have been proposed, they typically are provided with electrical cords with integral receptacles. The electrical cords with the integral receptacles are of specific lengths, thereby limiting the flexibility of the installer to create an electrical outlet raceway that meets the customer's needs. Being of pre-manufactured lengths, the prior art electrical cords typically require the installer to either have on hand a quantity of cords of various lengths or force the installer to fold the cord back on itself in order to adjust the length to fit the desired outlet location thereby leading to wastage and inefficient use of components.

Additionally, although prior art electrical outlet raceway systems have been proposed for high voltage devices, with the proliferation of low voltage devices such as communications jacks for cable television and surround sound, it would be beneficial to provide accommodations for connection of low voltage devices to the raceway system.

Accordingly, there is a need for an electrical outlet raceway system that eliminates the need for specialized electrical cords with integral receptacles. There is also a need for an electrical outlet raceway system that will accommodate both high and low voltage devices. The electrical outlet raceway system should be modular to enable an installer to configure the raceway to fit the requirements of a particular location and need, including providing the desired amount of electrical outlets and low voltage connections at the preferred location and spacing on a wall.

BRIEF SUMMARY OF THE INVENTION

The current invention is an electrical outlet raceway that eliminates the necessity of daisy chaining or doubling of electrical cords within the raceway. The electrical outlet raceway includes a modular system of several components that can be assembled together in order to provide additional electrical outlets on a wall, including a raceway back plate, a cordless receptacle, a raceway cover, a coupler, and one or more faceplates for attaching a high or low voltage component to the raceway. The electrical outlet raceway may also include a corner, end caps, and means for attaching faceplates to the raceway. Cordless receptacles enable the use of off-the-shelf electrical cords, thus allowing the installer to plan a given installation and obtain the proper number and lengths of electrical cords required to construct the planned installation. This eliminates the inefficiencies caused by the corded receptacles of conventional electrical raceways.

BRIEF DESCRIPTION OF THE SEVERAL VIEWS OF THE DRAWING(S)

Reference is made herein to the accompanying drawings, which are not necessarily drawn to scale, and wherein:

FIG. 2 is an end view of a raceway backplate which forms a portion of the electrical outlet raceway of FIG. 1.

FIG. 3 is a perspective view of the raceway backplate of FIG. 2.

FIG. 4 is an end view of a raceway cover with cutout that forms a portion of the electrical outlet raceway of FIG. 1.

FIG. 5 is a perspective view of the raceway cover with cutout of FIG. 4.

FIG. 6 is a sectional view of a raceway backplate and raceway cover taken along line 6-6 of FIG. 7.

FIG. 7 is a perspective view of a raceway backplate and raceway cover joined together.

FIG. 8 is a perspective view of a coupler which forms a portion of the electrical outlet raceway of FIG. 1.

FIG. 9 is an end view of the coupler of FIG. 8.

FIG. 10 is a perspective view of a coupler with relief for an electrical cord which forms a portion of the electrical outlet raceway of FIG. 1.

FIG. 20 is a rear elevation view of a receptacle face plate which forms a portion of the electrical outlet raceway of FIG. 1.

FIG. 21 is a sectional view of the receptacle face plate taken along line 21-21 of FIG. 20.

FIG. 22 is a front perspective view of the receptacle face plate.

FIG. 23 is a rear perspective view of the receptacle face plate.

FIG. 35 is a perspective view depicting the low voltage device secured to the cover.

FIG. 36 is a side view of the low voltage device secured to the cover.

FIG. 37 is a front view depicting the low voltage device secured to the cover.

FIG. 38 is a sectional view depicting a coupler assembled to a raceway cover and backplate in accordance with the present invention.

DETAILED DESCRIPTION

The present invention comprises an electrical outlet raceway system for providing additional electrical outlets along the wall of a building. The raceway system includes efficiencies over conventional raceways in that it does not require electrical cords with integral receptacles and therefore can be easily adapted to fit any desired wall configuration without causing inefficient use of electrical cords, such as daisy chaining or doubling of electrical cords within the raceway. The raceway system also can be configured to provide the exact number of high and low voltage devices that are required in a given area and the flexibility to provide the high and low voltage devices exactly at the desired location along the wall.

Figure 1:
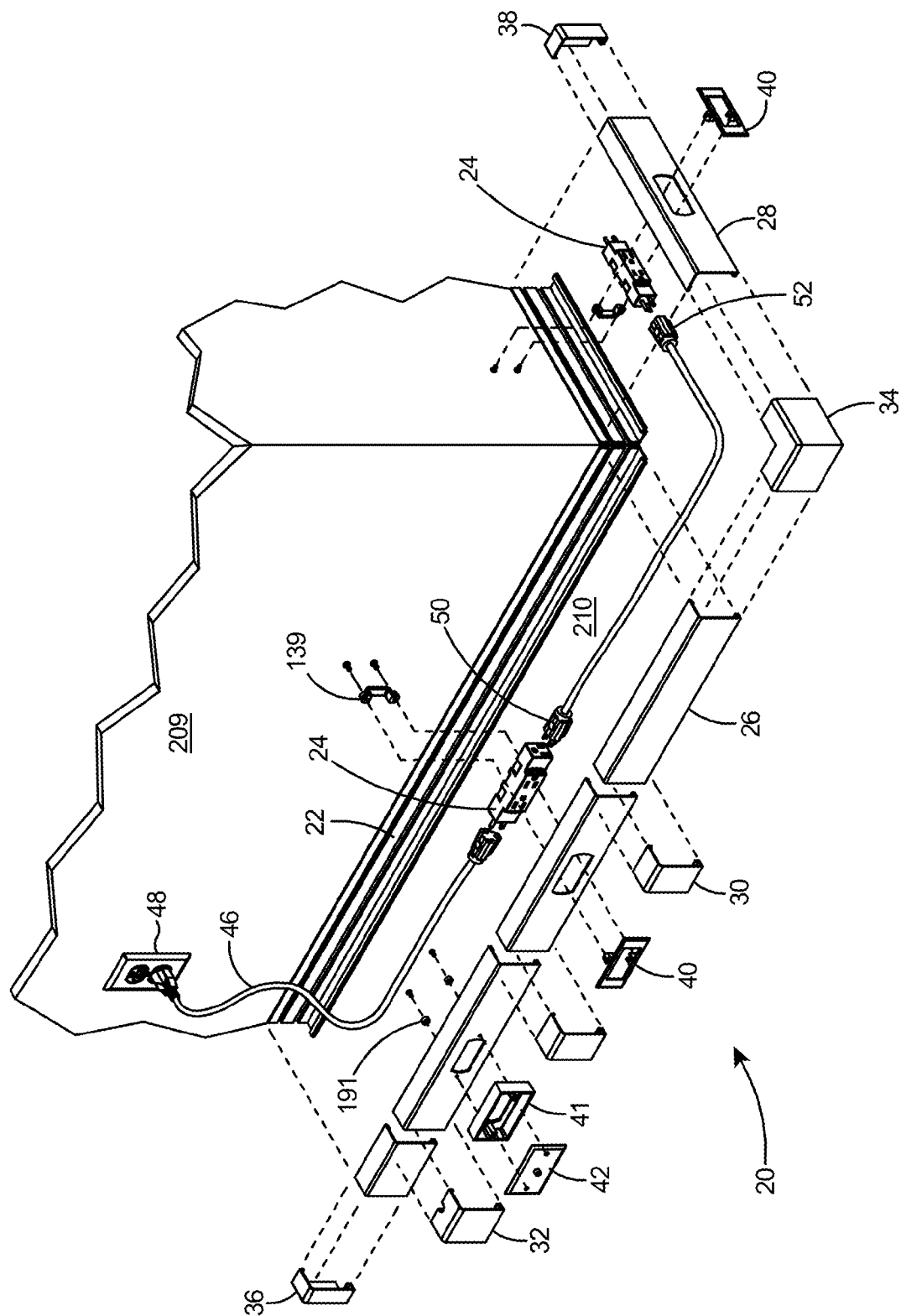
FIG. 1 is an isometric view of an electrical outlet raceway, in accordance with embodiments of the invention.
Figure 11:
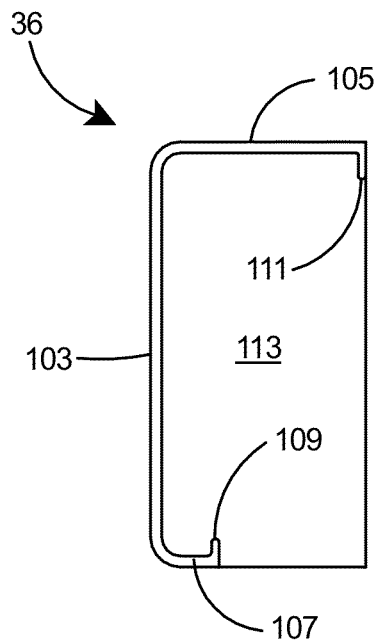
FIG. 11 is an end view of a left end cap which forms a portion of the electrical outlet raceway of FIG. 1.
Figure 12:
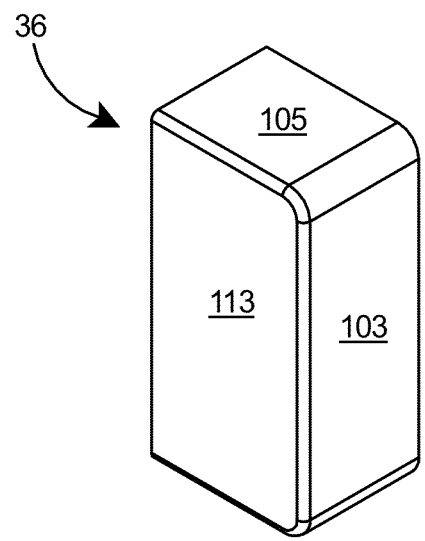
FIG. 12 is a perspective view of the left end cap of FIG. 11.
Figure 13:
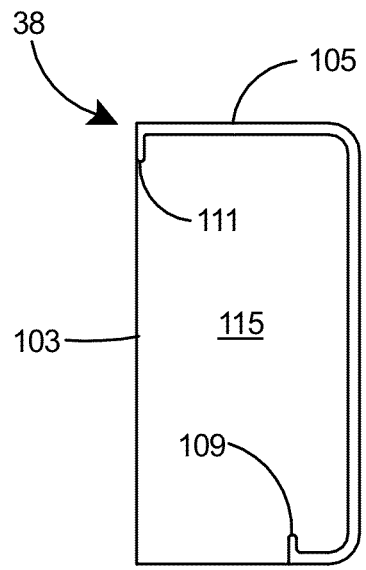
FIG. 13 is an end view of a right end cap which forms a portion of the electrical outlet raceway of FIG. 1.
Figure 14:
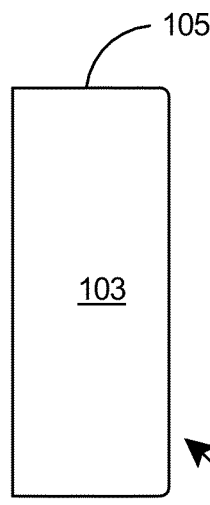
FIG. 14 is a side view of the right end cap of FIG. 13.
Figure 15:
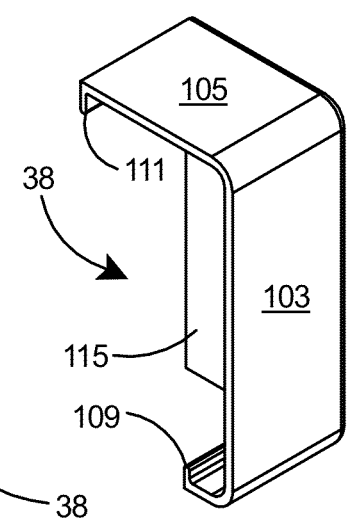
FIG. 15 is a perspective view of the right end cap.
Figure 16:
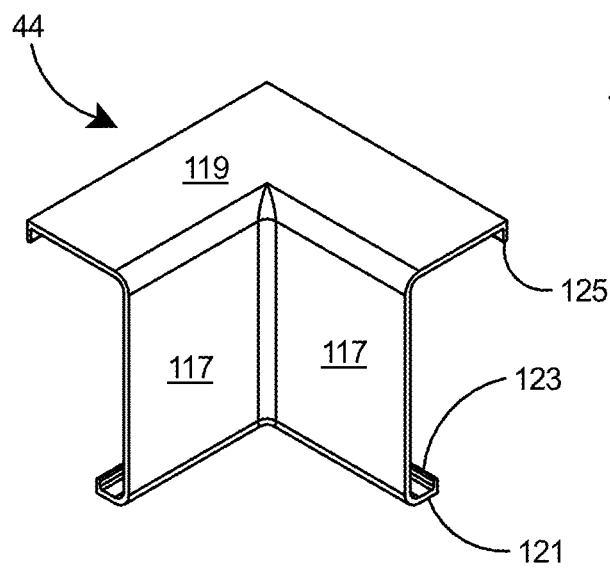
FIG. 16 is a perspective view of an inside corner which forms a portion of the electrical outlet raceway of FIG. 1.
Figure 17:
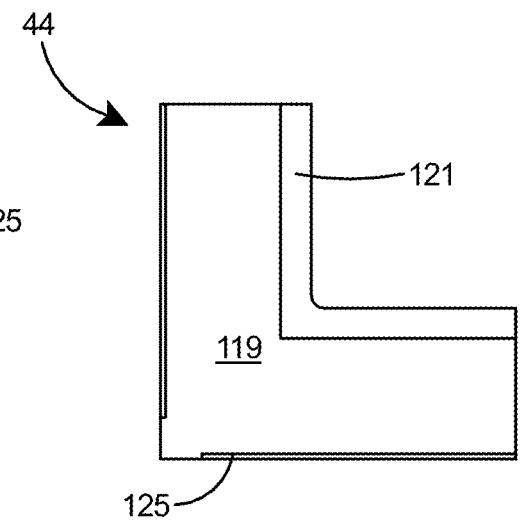
FIG. 17 is a bottom view of the inside corner of FIG. 16.
Figure 18:
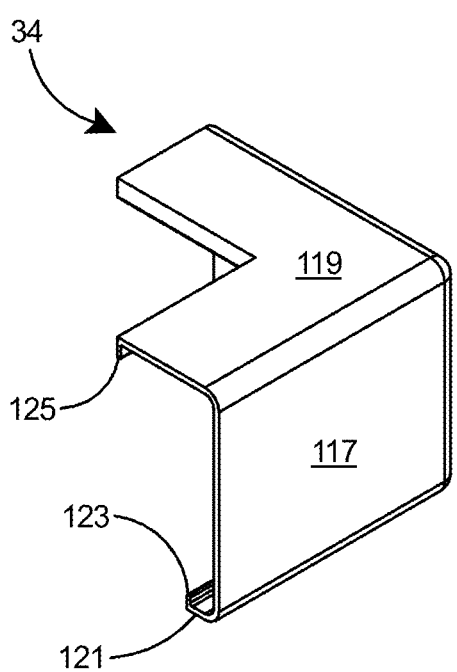
FIG. 18 is a perspective view of an outside corner which forms a portion of the electrical outlet raceway of FIG. 1.
Figure 19:
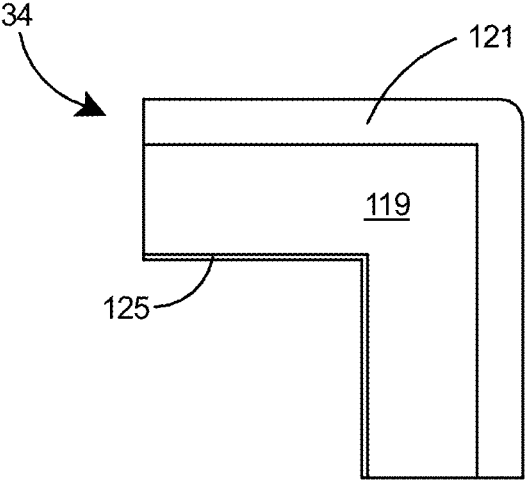
FIG. 19 is a bottom view of the outside corner of FIG. 18.

With reference to FIG. 1, the electrical outlet raceway 20 of the present invention includes several components that can be assembled together in order to provide electrical outlets or low voltage connections on a wall including a raceway back plate 22, cordless electrical receptacle 24, a raceway cover 26 and 28, a coupler 30 and 32, an end cap 36 and 38, and may include a corner member 34 and 44. The electrical outlet raceway 20 may also include one or more faceplates, including a high voltage faceplate 40 and a low voltage faceplate 41, for securing a cordless electrical receptacle 24 or a low voltage device 42 to the cutout raceway cover 28. As shown in FIGS. 16 and 17, the electrical outlet raceway 20 may also include an inside corner 44 for extending the raceway around an inside corner of a wall or an outside corner 34 for connection to a raceway backplate at an outside corner of two adjacent walls. Raceway covers include raceway cover 26 and a cutout raceway cover 28. Couplers a coupler 30 and a cord entry coupler 32. End caps include a left end cap 36 and right end cap 38. Corner members may include an outside corner 34 and an inside corner 44.

As shown in FIG. 1, in addition to the aforementioned components, or more conventional electrical cords 46 can be used to electrically connect a cordless electrical receptacle 24 to an existing electrical outlet 48 and to electrically connect together multiple electrical receptacles 24 within the electrical outlet raceway 20. Use of conventional electrical cords enables the installer to plan a given installation for a given section of wall, thereby enabling the installer to obtain conventional electrical cords of the proper length for the given installation.

The conventional electrical cords 46 include male 50 and female plug ends 52 for connecting to the existing outlet 48 or for electrically connecting the various cordless electrical receptacles 24 within the raceway system. The components can be used in any combination to form an electrical outlet raceway tailored to the meet the needs of the particular installation. The raceway covers 26 and 28 are typically molded of plastic and are capable of being cut, such that shears or a similar tool can be used to trim the cover sections to any desired length.

With reference to FIGS. 2 and 3, the raceway back plate 22 includes two rearward extending ribs 58 with pressure sensitive adhesive strips 60 secured to the ribs. The adhesive strips 60 are covered by release strips 62. The raceway back plate 22 can be secured to a wall by simply peeling away the release strips 62 and then pressing the ribs 58 with the exposed pressure sensitive adhesive against the wall. Raceway back plate 22 includes a back wall 64, a lower wall 66, and an upturned leg 68 in the lower wall 66 creating an elongated channel 70 on the outer side of the lower wall 66 along the length of the back plate 22. Back wall 64 includes a top edge 72 that, as a result of the rearward extending ribs 58, stands off some distance from the wall when the back plate 22 is adhered thereto.

With reference to FIGS. 4 and 5, raceway covers 26 and cutout raceway covers 28 include an outer plate 74 with apertures 75 therein, a bottom extension 76, an upward extending lip 78, and a top wall 80 having an end 82. Cutout raceway cover 28 includes an opening 83 therein. An outer tab 84 and an inner tab 86 extend downward from the end 82 of the top extension 80. Outer tab 84 is shorter than inner tab 86.

Referring to FIGS. 6 and 7, there is shown a raceway cover 26 secured to the backplate 22. A raceway cover 26 or cutout raceway cover 28 (see FIG. 5) are secured to the backplate 22 in the same manner, by inserting upward extending lip 78 of raceway cover 26 into elongated channel 70 of backplate 22. Raceway cover 26 is then rotated upward and toward the backplate until outer tab 84 of raceway cover 26 snaps over top edge 72 of backplate 22. Top edge 72 of backplate 22 seats within the notch 88 between the outer tab 84 and inner tab 86. The backplates 22, raceway covers 26, and cutout raceway covers 28 are molded from a flexible but tough plastic, thus the resilience of the top wall 80 of the raceway cover 26 enables outward flexing of the top wall thereby enabling the outer tab 84 to slip over the top edge 72 of the backplate 22. This enables easy assembly of the raceway covers 26 and 28 to the backplates 22 by an installer at the job site.

With reference to FIGS. 8-10, the couplers 30 and 32 include an outer wall 90, a top wall 92, a short bottom wall 94, a downward extending lip 96 and an upward extending lip 98. The cord entry couplers 32 include a cord entry aperture 101 that provides a passageway for insertion of an electrical cord into the electrical outlet raceway. Couplers 30 and 32 are used to cover the edges of adjacent assembled raceway sections, which assembled raceway sections consist of raceway covers 26 and 28 secured to a backplate 22. Referring to FIG. 38, there is illustrated the assembly of a coupler 30 to a raceway cover 26 and a backplate 22. A coupler 26 or cord entry coupler (see FIG. 10) is secured to the raceway cover 26 and backplate 22 assembly by inserting upward extending lip 98 of coupler 30 into the elongated channel 70 of the backplate 22. The coupler 30 is then rotated toward backplate 22 until downward extending lip 96 of coupler 30 snaps over end 82 of raceway cover 30.

Referring to FIGS. 11-15, left and right end caps 36 and 38 each include an outer wall 103, top wall 105, bottom extension 107, upward extending lip 109 and downward extending lip 111. Left end cap 36 includes a left sidewall 113 and right end cap includes a right sidewall 115. Left end cap 36 is used to cap or close off the left end of an assembled raceway section. The installer simply slides the left end cap 36 to the right onto the raceway section, wherein upward extending lip 109 slides into the elongated channel 70 (see FIG. 7) and downward extending lip 111 slides over the end 82 of the raceway cover 30. The right end cap 38 is used in a similar manner to close off the right end of an assembled raceway section. Right end cap 38 is slid to the left onto the right end of a raceway section, wherein upward extending lip 109 slides into the elongated channel 70 (see FIG. 7) and downward extending lip 111 slides over the end 82 of the raceway cover 30 (see FIG. 38).

With reference to FIGS. 16-19, the electrical outlet raceway system of the present invention also includes inside corners 44 for connection to a raceway backplate (not shown) at an inside corner of two walls and outside corners 34 for connection to a raceway backplate at an outside corner of two adjacent walls. The inside and outside corners 44 and 34 include an outer wall 117, a top wall 119, a bottom extension 121, an upward extending lip 123, and a downward extending lip 125. The corners 34 and 44 are joined to a raceway section by sliding upward extending lip 123 into the elongated channel (see FIG. 7) at an intersection of backplates at a corner and pressing the top wall 119 toward the backplates until downward extending lip 125 slides over the end 82 of the raceway cover 30 (see FIG. 38).

Referring to FIGS. 20-23, the high voltage faceplate 40 is used in conjunction with a cutout raceway cover 28 (see FIG. 28) to secure a cordless electrical receptacle 24 in the electrical outlet raceway 20 at any location desired by the installer. The high voltage faceplate 40 includes a frame 127 having an opening 129 therein, a front side 131, a rear side 133, and two bosses 135 extending from the rear side 133. The bosses 135 include bores 137 therein for receipt of fasteners.

Figure 24:
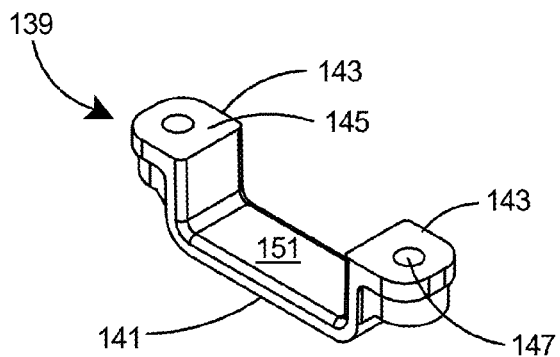
FIG. 24 is an isometric view of a strap that forms a portion of the electrical outlet raceway of FIG. 1.
Figure 25:
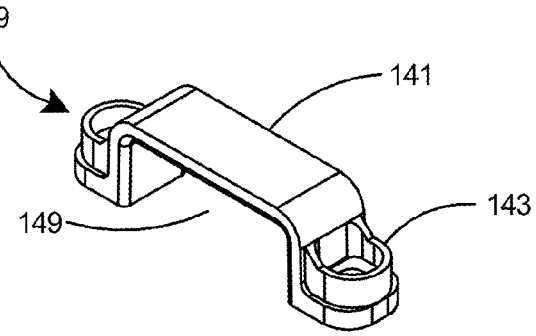
FIG. 25 is an isometric view of the strap from the opposing side to that of FIG. 24.

With reference to FIGS. 24 and 25, the electrical outlet raceway system further includes a strap member 139 that is used in conjunction with a high voltage faceplate 40 to secure a cordless electrical receptacle 24 to the raceway (see FIG. 28) in any location desired by the installer. Strap 139 is a one-piece member with a central bar 141 and two end arms 143. Each end arm 143 includes a flat base 145 and a bore 147 therein. Central bar 141 is offset from the plane common with the flat base 145 thereby forming a recessed area 149 between the central bar 141 and the two arms 143. The bar 141 of the strap 139 includes a flat inner surface 151.

Figure 26:
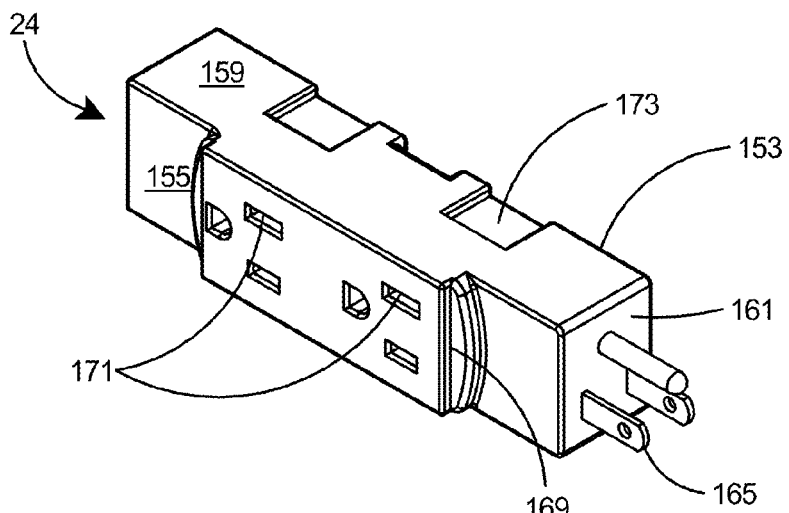
FIG. 26 is a front perspective view of a cordless receptacle which forms a portion of the electrical outlet raceway of FIG. 1.
Figure 27:
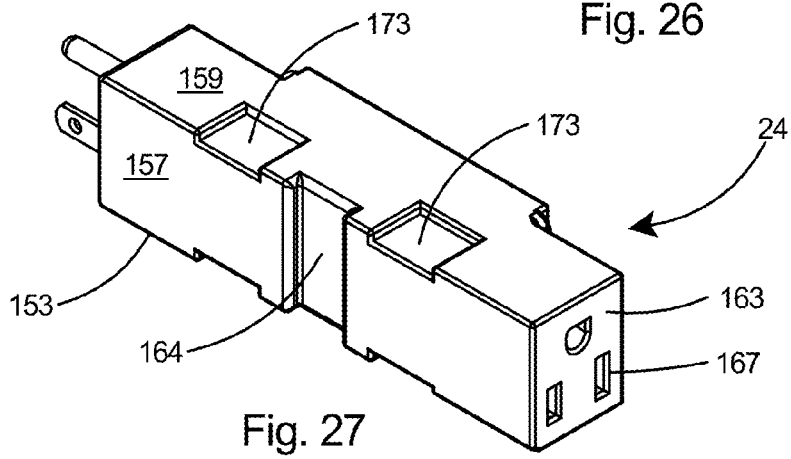
FIG. 27 is a bottom perspective view of the cordless receptacle of FIG. 26.

As illustrated in FIGS. 26 and 27, cordless electrical receptacle 24 includes a receptacle body 153 including a front side 155, a rear side 157, two lateral sides 159, a male end 161, and a female end 163. The rear side 157 includes a notch 164 with a flat surface located substantially centrally between the two ends 161 and 163. Male end 161 includes electrical prongs 165 extending therefrom and female end 163 includes prong receptacles 167. The front side 155 of the electrical receptacle 24 includes a raised face 169 and the raised face 169 includes paired female face receptacles 171 therein. The cordless electrical receptacle 24 also includes two recessed areas 173 in the lateral sides 159 positioned substantially near the rear side 157 of the receptacle body 153.

Figure 28:
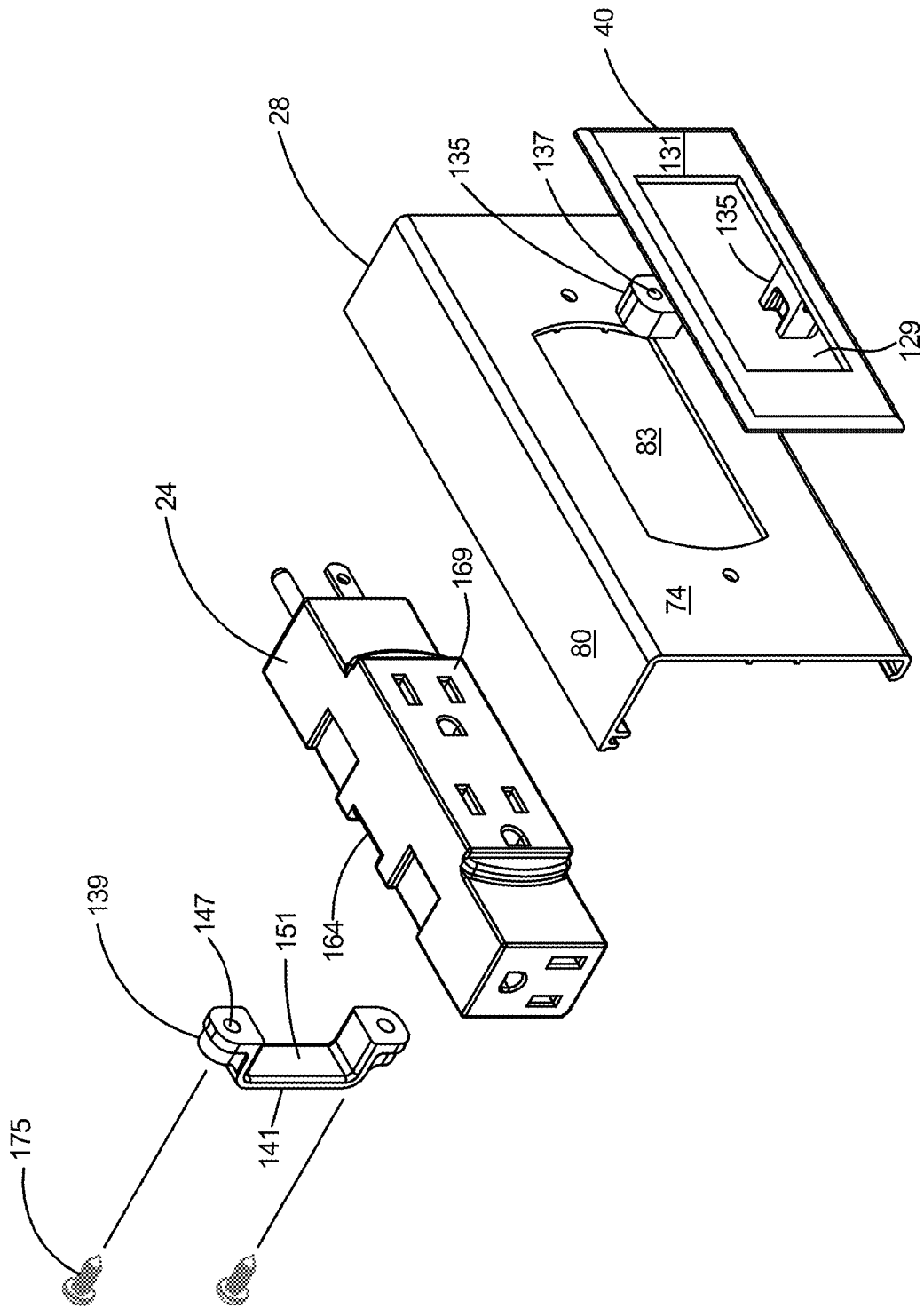
FIG. 28 is an exploded perspective view of the cordless receptacle being secured to the cover by the receptacle face plate and the strap.

Referring to FIG. 28, there is shown a cordless electrical receptacle 24 being secured to a cutout raceway cover 28 according to the present invention. A strap member 139, cordless electrical receptacle 24, cutout raceway cover 28, and high voltage faceplate 40 are aligned as shown. Bores 147 of strap member 139 are aligned with bores 137 in bosses 135 of high voltage faceplate 40. Fasteners 175 are driven through strap 139 and into bores 137 of high voltage faceplate 40, which secures the cordless electrical receptacle to the cutout raceway cover 28 and thus to the electrical outlet raceway system. Flat inner surface 151 of bar portion 141 of strap 139 engages the notch 164 portion of cordless electrical receptacle 24 and locks it to the cutout raceway cover.

Figure 29:
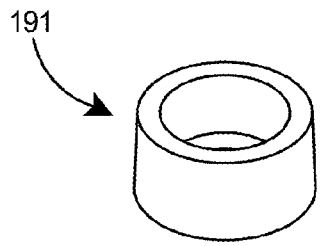
FIG. 29 is a perspective view of a screw shroud which forms a portion of the electrical outlet raceway of the present invention.
Figure 30:
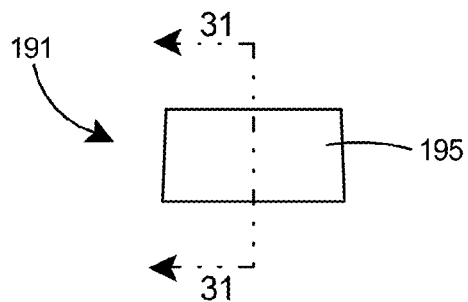
FIG. 30 is a side view of the screw shroud.
Figure 31:
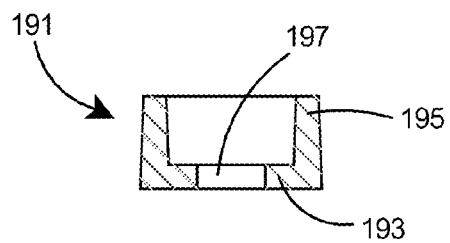
FIG. 31 is a sectional view of the screw shroud taken along line 31-31 of FIG. 30.
Figure 32:
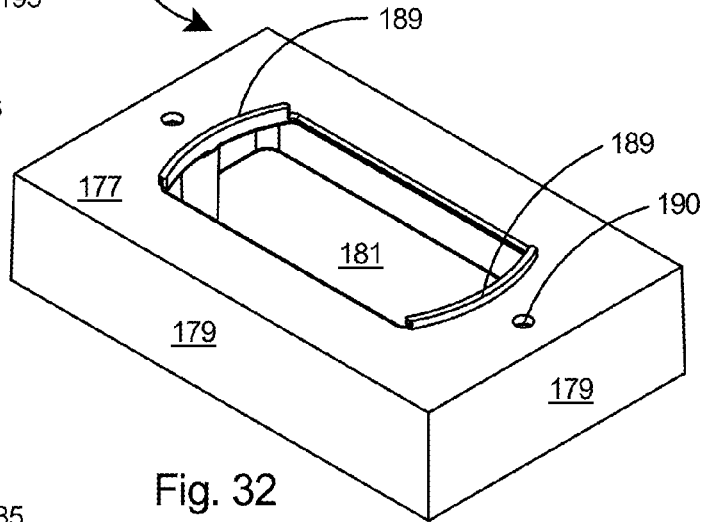
FIG. 32 is a rear perspective view of a low voltage adapter which forms a portion of the electrical outlet raceway of the present invention.
Figure 33:
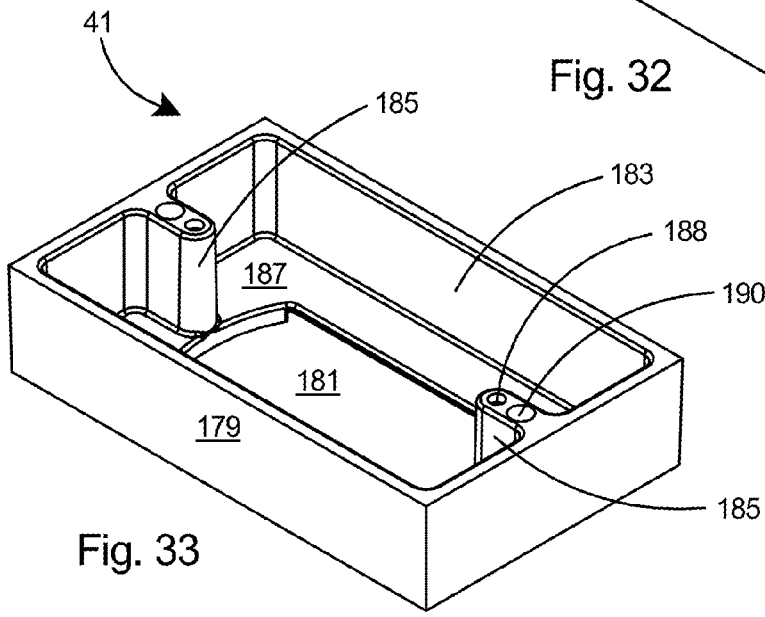
FIG. 33 is a front perspective view of the low voltage adapter.

With reference to FIGS. 32 and 33 there is shown a low voltage faceplate 41 for use with the electrical outlet raceway system of the present invention. The low voltage faceplate 41 is for use in mounting a low voltage device (not shown) to the electrical outlet raceway system. The low voltage faceplate 41 includes a back wall 177 and four sidewalls 179. Back wall 177 includes an opening 181 therein. The back wall and sidewalls create a cavity 183 and two bosses 185 extend from the front surface 187 of the back wall 177 into the cavity 183. Two short walls 189 extend rearward from the back wall 177 at the periphery of the opening 181. Each of the bosses 185 includes an inner bore 188 and outer bore 190 therein, with the outer bore 190 extending through the back wall 177. As shown in FIGS. 29-31, a screw shroud 191, used in conjunction with the low voltage faceplate 41, includes a bottom wall 193 and a peripheral wall 195 with a bore 197 there through.

Figure 34:
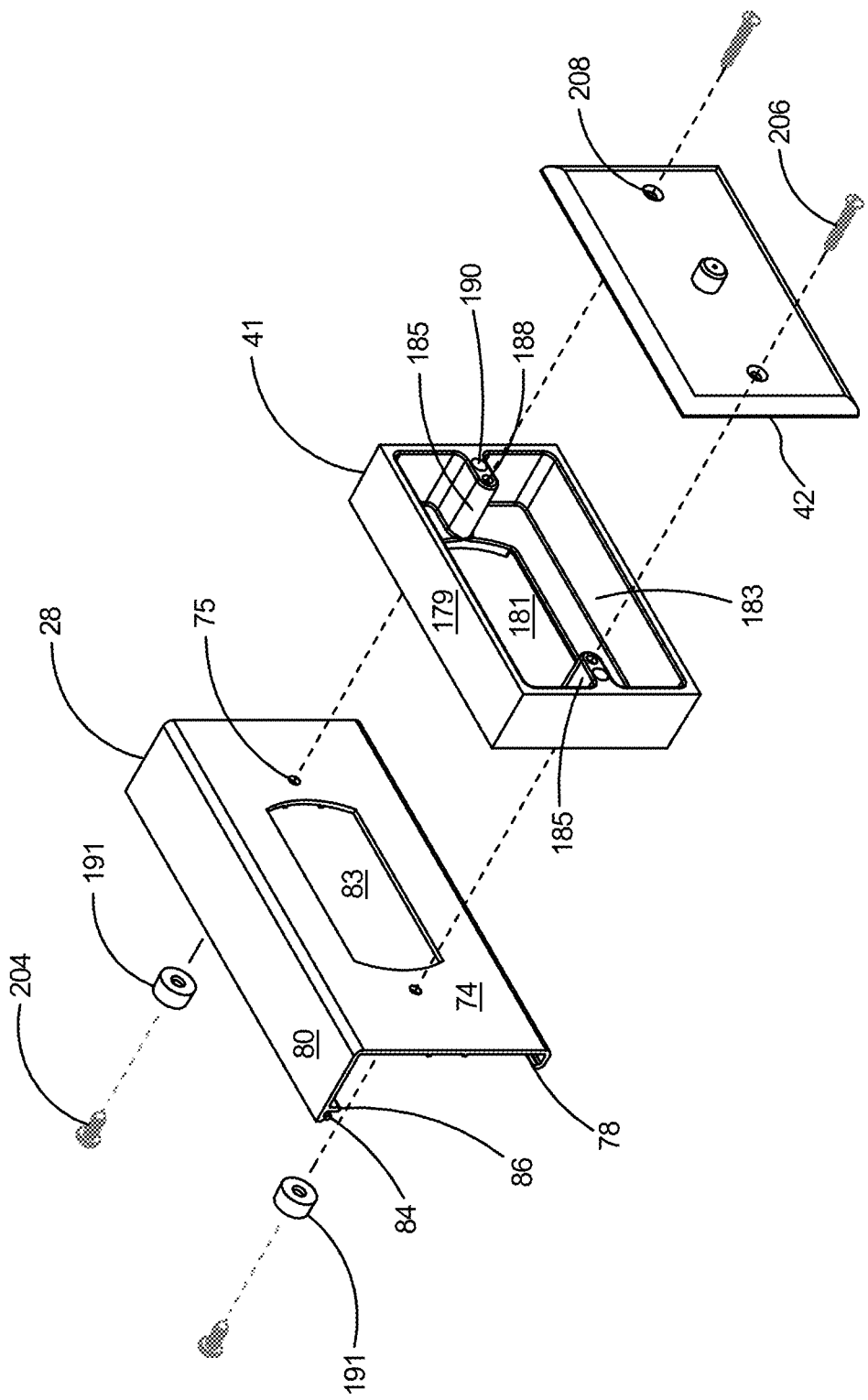
FIG. 34 is an exploded perspective view of a low voltage device being secured to the cover by the low voltage adapter.

Referring to FIG. 34, a low voltage device 42 may be secured to the electrical outlet raceway system by securing a low voltage faceplate 41 to a cutout raceway cover 28 using fasteners 204 and 206. Faceplate fasteners 204 are driven through screw shrouds 191, thence through apertures 75 in cutout raceway cover 28, and into outer bores 190 in back wall 177 of low voltage faceplate 41. Low voltage device 42 is then secured to low voltage faceplate 41 by securing device fasteners 206 through apertures 208 in low voltage device and into inner bores 188 in low voltage adapter 41. In this manner, any low voltage device may be secured to the electrical outlet raceway system of the present invention. FIGS. 35 to 37 depict the low voltage device 42 installed on a cutout raceway cover 28 that forms a portion of the electrical outlet raceway system of the present invention. As shown in FIG. 36, screw shroud 191 shields the faceplate fasteners from potential contact with cables within the raceway system in order to prevent potential fraying of the cable sheaths.

Referring to FIG. 1, the electrical outlet raceway 20 is typically installed at the juncture of the wall 209 and the floor 210 of a building. The raceway back plate 22 sections are adhered to the wall 122 with the pressure sensitive adhesive 60 (see FIG. 2) and the lower wall 66 seats against the floor 210. The raceway covers 26, cutout raceway covers 28, and cordless electrical receptacles 24, and low voltage devices 42 are secured to the raceway covers 26 and 28 in the manner described herein above to create an electrical outlet raceway 20. The back plates 22, raceway covers 26, cutout raceway covers 28, cordless electrical receptacles 24, and high and low voltage faceplates 40 and 41, are each molded in one piece of tough but resilient plastic. The back plates 22, raceway covers 26, and cutout raceway covers 28 can be cut with tin snips or similar tools in order to accommodate the needs of the particular installation.

To operate the invention, the installer plans the layout by placing a cordless electrical receptacle 24 or a low voltage device 42 at the desired location. Off the shelf electrical cords are then purchased as needed to join the cordless electrical receptacles 24 to each other and to the existing outlet 48. Back plate 22 sections are cut to size and pressed against the wall to be adhered thereto with the pressure sensitive strips 60 (see FIG. 2). Electrical cords 46 are attached to the cordless electrical receptacles 24 and to the existing outlet 48. Cordless electrical receptacles 24 are then secured to cutout raceway covers 28 using high voltage faceplates 40 and straps 139. Low voltage devices 42 are secured to the cutout raceway covers 28 using low voltage faceplates 41 and screw shrouds 191. The cutout raceway covers 28 with the high and low voltage devices attached are then snapped onto the back plates 22 in the manner described hereinabove. Raceway covers 26 are then cut to size to join adjacent cutout raceway covers 28 and are secured to the back plate 22. Left end caps 36, right end caps 38, outside corners 34, and inside corners 44 (see FIG. 16) are then secured to the raceway covers 26 and back plates 22 as required to create the raceway. Lastly, couplers 30 and cord entry couplers 32 are snapped over the raceway covers 26 and 28 at their adjoined edges to complete the electrical outlet raceway 20. In this manner, a homeowner or installer can provide additional electrical outlets 24 where needed and also low voltage devices 42 where needed without having to tear up the existing wall, drill holes through studs, pull cable through the studs, and install additional wall mounted electrical outlets.

Figure 39:
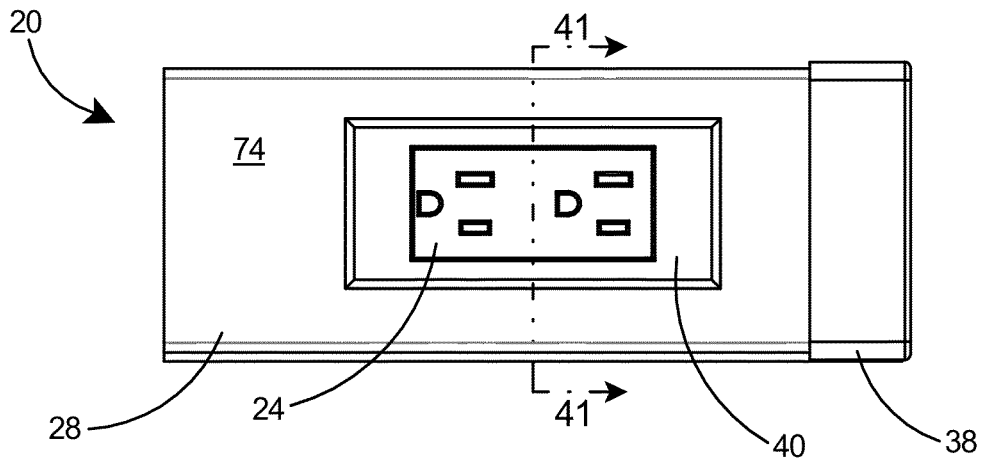
FIG. 39 is a front elevation view of a portion of an electrical outlet raceway system including a cordless electrical receptacle.
Figure 40:
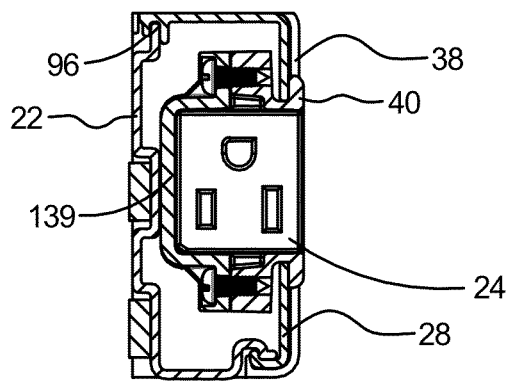
FIG. 40 is a sectional view of the raceway portion taken along line 41-41 of FIG. 39.
Figure 41:
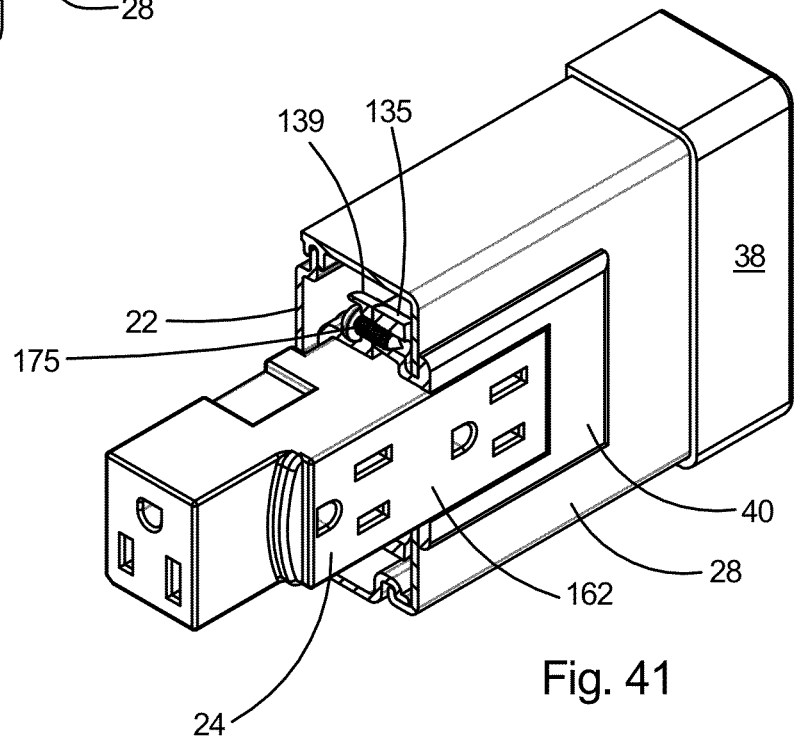
FIG. 41 is a perspective view of the raceway portion sectioned along line 41-41 of FIG. 39.

Referring to FIGS. 39-41, there is shown an assembled raceway portion including a cordless electrical receptacle 24 secured within a cutout raceway cover 28. As shown in FIG. 40, the cordless electrical receptacle 24 is held tightly within the inner raceway and is secured between the cutout raceway cover 28 and the back plate 22 by fasteners 175. As shown in FIG. 41, raised face 162 of cordless electrical receptacle 24 is easily accessible for plug in of electrical cords.

The raceway system is designed to work with conventional, off the shelf electrical cords. By utilizing conventional electrical cords, the installer is free to design the layout of the raceway system and subsequently purchase electrical cords in the proper lengths to complete the raceway system. Prior art electrical raceways typically included electrical cords integral with the electrical receptacles, which forced the installer to create a raceway system using the cord lengths supplied by the manufacturer. For a system in which the outlets were placed close together, this led to the folding of cords upon themselves, which causes the interior raceway channels to quickly become cramped with doubled up cables. Also, in raceway systems in which the outlets were placed far apart, two or more electrical cords were strung together to accommodate the longer distances. In the electrical raceway system of the present invention, by providing cordless electrical receptacles, cord wastage, cord doubling, and excess expenditures for inefficient cord usage are eliminated.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments herein were chosen and described in order to best explain the principles of the invention and the practical application, and to enable others of ordinary skill in the art to understand the invention for various embodiments with various modifications as are suited to the particular use contemplated.

What is claimed is:

1. An electrical outlet raceway, comprising:
   a raceway backplate for attachment to a wall;
   a cordless receptacle for providing an electrical receptacle within said raceway;
   a raceway cover for attachment to said raceway backplate to create a closed raceway channel;
   a faceplate for attaching an electrical component to the raceway;
   a coupler for covering the edges of adjacent assembled raceway sections;
   an end cap for closing off an end of said electrical outlet raceway; and
   said backplate including a lower wall, a back wall, a rib, and a pressure sensitive peel strip on said rib.

2. The electrical outlet raceway of claim 1 including an opening in said raceway cover.

3. The electrical outlet raceway of claim 1 including means for securing said faceplate to said raceway cover.

4. The electrical outlet raceway of claim 3 wherein said means for securing said faceplate to said raceway cover includes
   a boss on said faceplate; and
   a bore within said boss of said faceplate.

5. The electrical outlet raceway of claim 1 wherein said raceway backplate includes
   an upward extending lip and a recessed area on said lower wall; and
   a top edge on said back wall.

6. The electrical outlet raceway of claim 1 wherein said raceway cover includes
   an outer plate;
   a top extension; and
   a bottom extension.

7. The electrical outlet raceway of claim 6 wherein said raceway cover includes
   an upward extending lip on said bottom extension; and
   an outer tab and an inner tab on said top extension.

8. The electrical outlet raceway of claim 1 wherein
   said cordless receptacle includes two ends; and
   a male electrical plug on one of said ends and a female electrical receptacle on a second of said ends.

9. The electrical outlet raceway of claim 1 wherein said end cap is selected from the group including a left end cap and a right end cap.

10. The electrical outlet raceway of claim 1 wherein said coupler includes a downward extending lip and a cord entry aperture for providing a passageway for insertion of an electrical cord into said electrical outlet raceway.

* * * * *